United States Patent [19]
Krüger et al.

[11] Patent Number: 5,852,125
[45] Date of Patent: Dec. 22, 1998

[54] FLUORORUBBER, A PROCESS FOR ITS PRODUCTION AND ITS USE, AS WELL AS A PROCESS FOR PRODUCING FLUORORUBBER MOLDINGS AND/OR COATINGS

[75] Inventors: Ralf Krüger, Köln; Jürgen Ackermann, Leverkusen; Dieter Wrobel, Leverkusen; Helmut Steinberger, Leverkusen, all of Germany

[73] Assignee: Bayer Aktiengesellschaft, Leverkusen, Germany

[21] Appl. No.: 867,150

[22] Filed: May 30, 1997

[30] Foreign Application Priority Data

Jun. 3, 1996 [DE] Germany ............ 196 22 188.9

[51] Int. Cl.$^6$ .......................................... C08F 14/22
[52] U.S. Cl. .................. 525/326.2; 526/249; 526/255
[58] Field of Search ............................. 526/249, 255; 525/326.2

[56] References Cited

U.S. PATENT DOCUMENTS

| | | |
|---|---|---|
| 4,243,770 | 1/1981 | Tatemoto et al. . |
| 4,501,869 | 2/1985 | Tatemoto et al. . |
| 4,973,633 | 11/1990 | Moore ........................ 526/247 |
| 5,032,655 | 7/1991 | Moore ........................ 526/247 |
| 5,231,154 | 7/1993 | Hung . |
| 5,604,283 | 2/1997 | Wada et al. ................. 524/236 |
| 5,710,217 | 1/1998 | Blong et al. ................ 525/199 |

FOREIGN PATENT DOCUMENTS

| | | |
|---|---|---|
| 0101930 | 3/1984 | European Pat. Off. . |
| 0398241 | 11/1990 | European Pat. Off. . |
| 2386561 | 11/1978 | France . |
| 60-221409 | 11/1985 | Japan . |
| 03247608 | 11/1991 | Japan . |
| 06331040 | 11/1994 | Japan . |
| 0725948 | 1/1995 | Japan . |
| 9407929 | 4/1994 | WIPO . |

OTHER PUBLICATIONS

Database "Chemical Abstracts" (Host: STN): Abs. 104: 131 219 Colombus, OH, USA; & JP-A-60 221 409, Nov. 1985 (Asahi Chem. Ind. Co., Ltd.) Nov. 6, 1985, XP002036016.

*Primary Examiner*—Melvyn I. Marquis
*Assistant Examiner*—D. Aylward
*Attorney, Agent, or Firm*—Sprung Kramer Schaefer & Briscoe

[57] ABSTRACT

The present invention relates to a new fluororubber, a process for its production and its use, as well as a process for producing fluororubber mouldings and/or coatings.

10 Claims, No Drawings

FLUORORUBBER, A PROCESS FOR ITS PRODUCTION AND ITS USE, AS WELL AS A PROCESS FOR PRODUCING FLUORORUBBER MOULDINGS AND/OR COATINGS

The present invention relates to a new fluororubber, a process for its production and its use, as well as a process for producing fluororubber mouldings and/or coatings.

In the rubber industry there is a general desire for improved processability of the rubbers that are used, especially as regards the flow characteristics. The lower the viscosity of the rubber, the simpler the processing technology, the greater the productivity, and thus the less wastage there is. These aspects are very important, especially with fluororubbers, since these are expensive rubbers that cannot be processed completely on injection moulding machines used in the rubber industry.

Fluororubbers with Mooney viscosities ($ML_{1+10}$ at 120° C.) > 60 can generally be processed only by compression moulding or transfer moulding processes. Fluororubbers with Mooney viscosities $\leq$ 60 can of course be processed on special injection moulding machines, though this requires long cycle times and also produces a considerable amount of waste (flash-out).

Rubbers with Mooney viscosities ($ML_{1+10}$ at 120° C.) of 20–60 Mooney units are known, which can be processed according to this principle into press mouldings. However, these rubbers still have rather poor rubber mechanical properties (P. Ferrandez, St. Bowers, Gummi Fasem Kunstst. 48 (1995) 626–633).

In the case of rubbers, especially fluororubbers, sharp reduction in the molecular weight in order to lower the viscosity moreover leads to a deterioration of the vulcanisation properties, particularly the tensile strength. Liquid fluororubbers that have a satisfactory property profile are not known.

In addition the storage stability is nowadays still a problem with many mixtures. For example, the low molecular weight fluororubbers described in U.S. Pat. No. 4,361,678, which have iodine contents of between 1 and 30 wt.% and contain a molecular weight regulator of the type $Rf/I_x$, Rf being a perfluorocarbon, perfluorochlorocarbon or fluorochlorohydrocarbon radical, are not stable on storage. The lack of storage stability is probably due to the fact that in the regulator the iodine atom is bonded to a carbon atom containing at least one fluorine atom, preferably to a perfluoro-carbon residue, and thus at least half the resulting terminal groups have the structure —Rf—I, e.g. —$CF_2$—I. In such groups the iodine-carbon bond is particularly labile and iodine can very easily be split off under the action of heat or light. Fluoropolymers with high iodine contents are accordingly very difficult to handle. In addition the reactive groups provided for cross-linking can react prematurely and the resultant polymeric radicals can thus recombine. Cross-linked mouldings produced from such polymers also have poor ageing properties; see V. Arcella et al, Kautsch. Gummi, Kunstst. 44 (1991) 833–837.

Regulators that contain at least one iodine or bromine atom on a $CH_2$ group, as are described for example in JP-A 60 221 409 and U.S. Pat. No. 4,501,869, have according to U.S. Pat. No. 5,231,154 the disadvantage that they greatly retard the polymerisation. Up to now such regulators have only been used to produce fluororubbers with high molecular weights and/or low iodine contents.

There was accordingly a need for liquid fluororubbers that can at least be pumped at slightly elevated temperatures (60°–120° C.) and that can be processed in conventional thermoplastics processing machinery. In addition these liquid fluororubbers should be stable on storage and readily cross-linkable, and the resulting rubber parts should exhibit good mechanical as well as ageing properties that are very close to those of conventional solid fluororubbers.

The object of the present invention was therefore to provide fluororubbers that exhibit this property profile.

It has now been found that this object is achieved by a fluororubber comprising the essential constituents vinylidene fluoride and at least one compound from the group consisting of diiodomethane, 1,2-diiodo-1,1-difluoroethane, 1-iodo-2-bromo-1,1-difluoroethane, 1-bromo-2-iodo-1,1-difluoroethane and/or 1,2-dibromo-1,1-difluoro-ethane, and which contains specific proportions of the terminal group of the formula —$CH_2$—X where X=Br and/or iodine as well as contents of iodine and/or bromine of 1–5 wt.%, and has a specific viscosity.

The present invention therefore provides a fluororubber of a) vinylidene fluoride and optionally further fluorine-containing and/or non-fluorine-containing monomers and b) at least one compound from the group consisting of diiodomethane, 1,2-diiodo-1,1-difluoroethane, 1-iodo-2-bromo-1,1-difluoroethane, 1-bromo-2-iodo-1,1-difluoroethane and/or 1,2-dibromo-1,1-difluoroethane, in which at least 80% of the terminal groups have the formula —$CH_2$—X where X=Br and/or I, which contains amounts of iodine and/or bromine of 1–5 wt.%, preferably 1 to 4 wt.%, more preferably 2 to 3 wt.%, and which has a complex viscosity at 100° C. and $\omega=6.3\ s^{-1}$ of 0.01–30 kpa.s as well as a temperature index, calculated as quotient of the viscosities at 40° C. and 100° C., of 3–250.

Fluorine-containing monomers in the context of the invention are preferably fluorinated, optionally substituted ethylenes, which besides fluorine may contain hydrogen and/or chlorine, for example vinylidene fluoride, tetrafluoroethylene and chlorotrifluoroethylene, fluorinated 1-alkenes with 2 to 8 carbon atoms, for example hexafluoropropene, 3,3,3-trifluoropropene, chloropentafluoropropene, pentafluorpropen, hexafluoroisobutene and/or perfluorinated vinyl ethers of the formula $CF_2$=CF—O—X where X=$C_1$–$C_3$perfluoroalkyl or —($CF_2$—CFY—O)$_n$—$R_F$, wherein n=1–4, Y=F or $CF_3$ and $R_F$=$C_{1-C3}$-perfluoroalkyl.

Non-fluorine-containing monomers in the context of the invention are preferably ethylene, propene, isobutene or vinyl esters, for example vinyl acetate.

In the fluororubber according to the invention component a) is preferably a mixture of vinylidene fluoride with further fluorine-containing and/or non-fluorine-containing monomers.

Particularly preferred is the combination of vinylidene fluoride, hexafluoropropene, as well as optionally tetrafluoroethylene and/or perfluorinated vinyl ethers, for example perfluoro-(methyl vinyl ether).

Compound b) is preferably diiodomethane.

The compounds b) are readily accessible, for example by halogen or interhalogen addition to vinylidene fluoride.

Preferably more than 90% of the terminal groups have the formula —$CH_2X$ where X=iodine or bromine. The number average molecular weight Mn is preferably between 30000 and 3000 g/mole, more preferably 20000 to 5000 g/mole, most preferably 13000–6000 g/mole.

As was demonstrated by $^{19}F$ spectroscopy and $^1H$-NMR spectroscopy, the fluororubber according to the invention contains no groups of the formula —$CF_2$—I or >CF—I in which iodine can be readily split off under the action of heat or light.

In a preferred embodiment of the invention there are added to the fluororubber according to the invention fillers, for example carbon black, silicic acid, $TiO_2$ (filler-containing mixture) and/or crosslinking agents, i.e. catalyst and co-crosslinking agent (cross-linkable and optionally filler-containing mixture), for example an organic peroxide and triallyl isocyanurate (see for example U.S. Pat. No. 5,032,655) or bisamines/bisphenols in combination with phase transfer catalysts and metal oxides, as described in A. L. Lugothetis, Polym. Sci., Vol. 14, (1989), 251–296.

The fluororubbers according to the invention or filler-containing mixtures prepared therefrom still have at room temperature a consistency, i.e. a relatively high viscosity, that is similar to that of the known solid rubbers, and exhibit a sharp drop in viscosity on raising the temperature. In the temperature range between 60° C. and 120° C. the fluororubbers have a quasi-liquid consistency. The complex viscosities, measured with a Bohlin rheometer of the type VOR-Melt (cycle frequency $\omega = 6.3 \ s^{-1}$) and expressed in each case in kpa.s, are preferably in the following characteristic ranges:

| Viscosity, $\omega = 6.3 \ s^{-1}$ [kPa.s] | 40° C. | 100° C. |
|---|---|---|
| Fluororubber | 1–100 | 0.01–30 |
| (Fluororubber + 30 parts by wt. of carbon black MTN 990) | 10–200 | 0.1–50 |

The temperature index, calculated as the quotient of the viscosities at 40° and 100° C., is accordingly preferably 3 to 250 for the fluororubber, and 3 to 300 for the filler-containing fluororubber (filler-containing mixture).

In one embodiment of the invention the fluororubber according to the invention is crosslinked to form rubber-elastic mouldings. This is preferably effected by radiation or by means of peroxides through a free radical mechanism. Moreover, the filler-containing or also crosslinkable and optionally filler-containing mixtures can be crosslinked, preferably by radiation or by means of peroxides, to form rubber-elastic mouldings.

The invention also provides a process for producing the fluororubber according to the invention, in which a) vinylidene fluoride together with optionally a further fluorine-containing or non-fluorine-containing monomer is polymerised through a free radical mechanism in the presence of b) at least one iodine-containing and/or bromine-containing compound from the group comprising diiodomethane, 1,2-diiodo-1,1-difluoroethane, 1-iodo-2-bromo-1,1-difluoroethane, 1-bromo-2-iodo-1,1-difluoroethane and/or 1,2-dibromo-1,1-difluoroethane, at temperatures of 0°–70° C., preferably 0°–60° C., in the presence of an initiator and/or further auxiliaries, preferably a redox initiator system.

The polymerisation can be carried out in solution, suspension or emulsion, though it is preferably carried out in aqueous emulsion in the presence of a redox initiator.

The amount of component b) is at least 1–5 wt.%, based on the weight of fluoro-monomers to be reacted.

As medium for the solution polymerisation a solvent with a low chain transfer constant may be used, for example hexafluorocyclopentane, perfluorohexane, perfluoro (tributylamine) or trichlorotrifluoroethane.

Initiators that may be used include organic, optionally fluorinated peroxides that are preferably soluble in the monomer or solvent, for example tert-butyl perpivalate, diisopropyl peroxydicarbonate or trifluoroacetyl peroxide, or azo compounds such as azo-bis(isobutyronitrile) or azo-bis(2,4-dimethyl valeronitrile).

In the case of aqueous emulsion polymerisation fluorinated emulsifiers, for example the water-soluble salts of $C_6$–$C_{12}$-perfluorocarboxylic acids or perfluorosulphonic acids, are preferably added as auxiliaries in concentrations of 0.05 to 2 wt.% in order to stabilise the dispersions. The sodium or ammonium salts of perfluorooctanoic acid and the lithium salt of perfluorooctylsulphonic acid may be mentioned here by way of example.

As initiators there may also be used inorganic peroxides, for example peroxydisulphates, perborates, percarbonates, generally in the form of their potassium, sodium or ammonium salts, and preferably in combination with reducing agents. Suitable reducing agents include sulphur compounds such as sodium sulphite, sodium pyrosulphite or sodium formamidine sulphinic acid, as well as organic reducing agents such as ascorbic acid, metal salts such as iron (II) or cobalt (II) salts, organometallic compounds, etc. A preferred redox initiator system is a system consisting of at least one manganese compound in oxidation states $\geq 3$ and optionally a reducing agent, for example carboxylic acids, dicarboxylic acids, polyhydric alcohols and hydroxycarboxylic acids.

The fluororubbers according to the invention can be produced batchwise, but preferably by semi-continuous or continuous processes.

The polymerisation is carried out under autogenous pressure, which is established depending on the degree of filling of the reactor, the temperature, and the amounts of monomers.

The invention further provides the use of the fluororubber according to the invention to produce coatings or for polymer-analogous reactions in order to replace iodine or bromine terminal groups preferably by other reactive groups. The filler-containing or crosslinkable and optionally filler-containing mixtures too can be used to produce coatings or for polymer-analogous reactions to replace iodine or bromine groups by other reactive groups by means of nucleophilic or free radical substitution.

The iodine and bromine groups are preferably replaced by reaction with compounds that contain primary or secondary amino groups, allyl or vinyl groups, as well as aromatic radicals that can be alkylated.

The invention also provides a process for producing fluororubber mouldings and/or coatings, in which fluororubbers with a viscosity temperature index of 3 to 250 at 40°/100° C. are injection moulded at temperatures of 40° to 250° C. under pressure, preferably 20 to 200 bar, in moulds heated to 100° to 250° C., preferably 120° to 200° C., and are crosslinked in situ.

The injection moulding is carried out in conventional thermoplastics injection moulding or plunger-type feed machines, as described for example in Ullmann Vol. 11 (1960), p. 63. Preferably the fluororubber, heated to 40° to 250° C., is fed into the thermoplastics injection moulding or plunger-type feed machine. Heated feed machines and conveying machines, preferably heated scoop-type piston pumps, are particularly suitable for this purpose.

The fluororubber according to the invention or a mixture of a plurality of fluororubbers according to the invention are preferably used as fluororubber.

Filler-containing mixtures or crosslinkable and optionally filler-containing mixtures may also be used.

The improved flowability enables crosslinking compounds or compounds that activate/initiate crosslinking to be used, for example peroxides, bases or initiators having a high reaction rate. These produce in the rheometer a crosslinking behaviour with half-life periods of 1 to 20 mins at 100° C. for a 50% increase in the shear modulus (t50).

The fluororubbers can be crosslinked, for example directly through the terminal iodine or bromine atoms as reactive groups, in a 100° to 250° C. hot mould. This crosslinking can be carried out in a conventional free radical way by radical-forming substances such as organic peroxides or by nucleophilic replacement of the terminal iodine, for example by means of polyfunctional amines.

Moreover, the terminal iodine atoms can also be replaced by other reactive groups, followed by crosslinking. Nucleophilic substitution reactions, such as an amination or saponification, may for example be used for this purpose. Terminal C—C double bonds can be introduced, for example by radical addition of allyl acetate followed by elimination.

The fluororubber according to the invention is characterised by the fact that it can be converted using the advantageous liquid rubber technology into crosslinked mouldings or coatings.

The combination of good flowability and high crosslinking rate for covalently crosslinked elastomers could be utilised hitherto only with liquid silicone rubber, in order to shorten the cycle times for producing elastomeric mouldings.

EXAMPLES OF IMPLEMENTATION

Example 1

25.2 kg of deionised water and 60.2 g of lithium perfluorooctyl sulphonate were placed in a 36 l capacity autoclave. 40 g of oxalic acid dihydrate and 31 g of diiodomethane (DM) (Merck) were dissolved in the mixture, the pH of the aqueous contents of the autoclave being 3.2. The autoclave was closed, evacuated four times, each time followed by charging with nitrogen at a pressure of 3 bar, and each time stirred slowly for 10 minutes. 269 g of vinylidene fluoride (VDF) and 368 g of hexafluoropropene (HFP) were added to the evacuated autoclave and the reaction mixture was heated to 25° C. while stirring. After attaining this temperature the internal pressure of the autoclave was 9.4 bar. The polymerisation was initiated by adding 53 ml of an aqueous solution containing 20 g/l of potassium permanganate. Immediately after this initial addition more of the aforementioned potassium permanganate solution was then added continuously at a rate of 39 ml/hr. The polymerisation began after 26 minutes, as indicated by the drop in pressure. During the polymerisation a monomer mixture of 60 wt.% of vinylidene fluoride and 40 wt.% of hexafluoropropene was forced in under pressure so that the internal pressure of the autoclave was maintained constant at 9.4±0.2 bar. Also, 30 ml of a solution of diiodomethane in 1,1,2-trichloro-1,2,2-trifluoroethane (100 g/l) were added after every conversion of 200 g of monomer. In this way a total of 944 g of vinylidene fluoride and 622 g of hexafluoropropene as well as 45 g of diiodomethane (DIM) were pumped in over a reaction time of 15 hours. In order to terminate the polymerisation the addition of permanganate was discontinued, the unreacted monomer mixture was removed from the reactor by releasing the pressure and evacuation, and the remaining autoclave contents were cooled. 1340 g of a soft, rubber-like copolymer were isolated from the latex by freeze coagulation, washing, and drying for 24 hours at 50° C. in a vacuum drying cabinet.

The following copolymer composition was established by 19 F-NMR analyses: 19.8 mole% of hexafluoropropene, 80.2 mole% of vinylidene fluoride. In the region of the chemical shift (solvent: acetone; standard: $CFCl_3$) no signal is observed for the $CH_2$—$\underline{CF_2}$—I group at −38 . . . −39 ppm, nor is there any new signal in the range between −70 and −80 ppm that can be attributed to the sequence $CF_2$—CFI($\underline{CF_3}$). Instead, two new signals occur at −108.1 and −111.8 ppm, which are attributed to the sequences —$CH_2$—$\underline{CF_2}$—$CH_2$—I and —$CH_2$—$\underline{CF_2}$—$CH_2$—$CH_2$—I.

The iodine content of the polymer measured by elementary analysis is 2.7 wt.%. A Staudinger index ($\eta$) at 35° C. of 0.12 dl/g was measured in methyl ethyl ketone. The number average molecular weight (membrane osmometry) is 10 000 g/mole. The complex viscosities were measured in a Bohlin rheometer of the type VOR MELT at different temperatures (Table 1).

Examples 2–3

The polymerisation was carried out in a similar way to that described in Example 1, the following amounts of vinylidene fluoride, hexafluoropropene and diiodomethane (DIM) being added within 15 hours:

| Example | 2 | 3 |
|---|---|---|
| VDF (kg) | 1.8 | 0.95 |
| HFP (kg) | 1.2 | 0.62 |
| DIM (g) | 90 | 60 |
| Product yield (kg) | 2.49 | 1.41 |
| Iodine content (wt. %) | 2.4 | 3.0 |
| [$\eta$] at 35° C. * (dl/g) | 0.17 | 0.13 |

* in dimethyl acetamide (+8.7 g/l LiBr)

As described in Example 1, no indication was found in the $^{19}$F-NMR spectra of the existence of —$CF_2$—I sequences.

Example 4–6

To prepare crosslinkable mixtures, 30 parts of carbon black MT N 990, 3 parts of calcium hydroxide, 3 parts of Perkalink® 301/50 (triallyl isocyanurate), 50% in inactive fillers) as well as 3 parts of Luperco® 101 XL-45 (2,5-dimethyl-2,5-bis(tert.-butylperoxy)-hexane; 45% in inactive fillers) were incorporated into 100 parts by weight of the fluororubbers from Examples 1–3. Samples of the compounds were taken before adding the peroxide and, as in the case of the fluororubber from Example 1, were used to measure the complex viscosities, see Table 1.

TABLE 1

Complex viscosities ($\eta$*) at various temperatures, measured with a Bohlin rheometer VOR Melt (cycle frequency $\omega = 6.3$ s$^{-1}$), figures in each case in kPa.s.

| | 1 | 2 | 3 |
|---|---|---|---|
| Example | Fluororubber | Compound | Compound | Compound |
| 40° C. | 12.5 | 26.8 | 82.7 | 52.2 |
| 80° C. | 0.42 | 1.3 | 1.71 | 0.49 |
| 100° C. | 0.16 | 0.66 | 0.42 | 0.30 |
| 120° C. | | | 0.19 | 0.23 |
| 140° C. | | | 0.16 | 0.18 |
| 160° C. | 0.03 | 0.31 | | |
| $\eta$*(40° C.) | 78.1 | 49.6 | 196.9 | 174.0 |
| $\eta$*(100° C.) | | | | |

In order to determine the crosslinking behaviour the peroxide-containing mixtures were investigated in a Monsanto rheometer, type MDR 2000 E, at 170° C. (measurement time 30 min):

| Example | 4 | 5 | 6 |
|---|---|---|---|
| Fluororubber | 1 | 2 | 3 |
| s'min [dNm] | ≦0.01 | ≦0.01 | ≦0.01 |
| s'max [dNm] | 9.9 | 6.8 | 5.4 |
| t 50 [min] | 2.6 | 3.0 | 3.4 |

The mixtures were pressure vulcanized for 30 minutes at 170° C. and 200 bar in moulds for 1×10×10 mm plates and 6×70 mm cylinders, and then post-vulcanized in a circulating air oven (1 hr at 160° C., 1 hr at 170° C., 2 hrs at 180° C. and 20 hrs at 230° C.). The tensile/elongation properties were measured on the vulcanized mouldings before and after hot air ageing (72 hrs/275° C.) and oil ageing (5×94 hrs in BP MK 4437 at 160° C.), as well as the compression sets (CS) (70 hrs/200° C., DIN 53 517, test body I); Table 2.

TABLE 2

| Example | 4 | 5 | 6 |
|---|---|---|---|
| Initial properties | | | |
| Tensile strength [N/mm$^2$] | 11.9 | 7.9 | 7.7 |
| Elongation [%] | 217 | 174 | 167 |
| S$_{50}$ [N/mm$^2$] | 4.9 | 2.7 | 3.8 |
| After hot air ageing (70 hrs/275° C.) | | | |
| Tensile strength [N/mm$^2$] | 8.6 (−28%) | 5.6 (−29%) | 5.2 (−32%) |
| Elongation [%] | 112 (−48%) | 80 (−54%) | 75 (−55%) |
| S$_{50}$ [N/mm$^2$] | 3.9 (−20%) | 3.3 (+22%) | 3.9 (+3%) |
| CS (70 hrs/200° C.) Before/after [%] | 8/6 | 16/9 | 9/9 |
| Hot air ageing Oil ageing in BP MK 4437 (5 × 94 hrs/160° C.) | | | |
| Weight increase [%] | 0.09 | 0.10 | 0.09 |
| Tensile strength [N/mm$^2$] | 9.5 (−20%) | 6.7 (−15%) | 6.6 (−14%) |
| Elongation [%] | 126 (−42%) | 108 (−38%) | 103 (−38%) |
| S$_{50}$ [N/mm$^2$] | 4.8 (−2%) | 3.2 (+19%) | 3.4 (−11%) |

These values show that crosslinked mouldings having excellent ageing properties can be produced from the fluororubbers of Examples 1, 3 and 4 despite their low initial molecular weights.

Example 7

The polymerisation is carried out in a similar way to that of Example 1, except that 476 g of vinylidene fluoride and 671 g of hexafluoropropene were used. The prevailing initial pressure was 15.9 bar. The following amounts were added subsequently within 12 hrs:

| VDF [g] | 800 |
|---|---|
| HFP [g] | 530 |
| DIM [g] | 45 |
| Product yield [kg] | 1.24 |

The iodine content of the resulting copolymer was 4.0 wt.%. A Staudinger index at 35° C. of 0.11 dl/g was measured in N,N-dimethyl acetamide (+8.7 g LiBr).

Example 8

30 parts of carbon black MT N 990, 3 parts of calcium hydroxide and 10 parts of Perkalink 301/50 (triallyl isocyanurate, 50% in inactive fillers) as well as 3 parts of Luperco 101 XL (2,5-dimethyl-2,5-bis(tert.-butylperoxy)-hexane; 45% in inactive fillers) were incorporated in 100 parts by weight of the fluororubber from Example 7 in a similar manner to that described in Examples 4–6.

To determine the crosslinking behaviour the peroxide-containing mixture was investigated in a Monsanto rheometer, type MDR 2000 E, at 170° C. (measurement time 30 mins), Table 3.

Comparative Example 1

2.78 kg of deionised water and 4.5 g of lithium perfluorooctyl sulphonate were placed in a 4.1 l capacity autoclave. 40 g of 1,4-diiodoperfluorobutane (Fluoro-chem Ltd.) were purified beforehand by shaking with aqueous sodium thiosulphate solution and then added to the autoclave. The autoclave was closed, evacuated four times, and then charged each time with nitrogen at a pressure of 3 bar and slowly stirred for 10 minutes.

27 g of vinylidene fluoride and 53 g of hexafluoropropene were added to the evacuated autoclave and the reaction mixture was heated to 80° C. while stirring. After attaining this temperature the pressure inside the autoclave was 15 bar. The polymerisation was initiated by adding 2.8 g of ammonium peroxydisulphate, dissolved in 20 g of water. The polymerisation began after 7 minutes, which was indicated by the drop in pressure. During polymerisation a monomer mixture of 60% of vinylidene fluoride and 40 wt.% of hexafluoropropene was forced in under pressure so that the internal pressure of the autoclave was maintained constant at 17±0.2 bar. A total of 93 g of vinylidene fluoride and 216 g of hexafluoropropene were subsequently added in this way over a reaction time of 6 hrs. The reactor contents were cooled to terminate the polymerisation and the unreacted monomer mixture was removed by releasing the pressure and evacuating the reactor. The latex was coagulated by stirring into a 6% calcium chloride solution, washed with water and dried for 24 hours at 50° C. in a vacuum drying cabinet, 280 g of a soft, rubber-like copolymer being obtained.

The following copolymer composition was determined by $^{19}$F-NMR analyses: 17.3 mole-% of hexafluoropropene, 80.5 mole-% of vinylidene fluoride, and 2.2 mole-% of (CF$_2$)$_4$ units. A signal is found at 0–38 ppm (solvent: acetone; standard: CFCl$_3$) which is attributed to the —CH$_2$—CF$_2$—I group and corresponds to about 1.2 mole-% (1.9 wt.%) of iodine. The sequence —CF$_2$—CF$_2$—CF$_2$—CF$_2$—I (−59 . . . −60 ppm) could not be detected. An iodine content of 4.8 wt.% was measured by elementary analysis. This means that about 40% of the terminal iodine atoms are bound to a CF$_2$ group. A Staudinger index (h) of 0.07 dl/g at 35° C. was measured in N,N-dimethyl acetamide (+8.7 g LiBr).

The products from Example 7 and Comparative Example 1 were each heated for 4 hours at 100° C. in a glass flask, a gentle stream of nitrogen being led over the products. Whereas the very pale yellow product from Example 7 retained its colour, the product from Comparative Example 1, which was colourless in the crude state, turned brown.

Comparative Example 2

In order to check the crosslinking behaviour, a mixture was prepared from the rubber from Comparative Example 1 according to in a similar manner to that described in Example 8. The results of the MDR rheometer measurements are recorded in Table 3.

TABLE 3

Results of the MDR rheometer measurements (170° C./30 min) on the vulcanisation mixtures and tensile/elongation measurements on the vulcanisates from Example 8 and Comparative Example 2

| Example<br>Comparative Example | 8 | 2 |
|---|---|---|
| s'min [dNm] | ≦0.01 | ≦0.01 |
| s'max [dNm] | 34.2 | 31.2 |
| t 50 [min] | 1.73 | 2.0 |
| Tensile strength [N/mm$^2$] | 13.2 | 6.9 |
| Elongation [%] | 51 | 26 |
| Shore Hardness A | 89 | 89 |

A comparison of the results shows that the product according to the invention has, at roughly the same crosslinking density (cf. Shore hardness and s'max), a significantly higher strength and elongation at break than the Comparative Example 2 (not according to the invention).

Comparative Example 3

The polymerisation was carried out at 80° C. in a similar manner to that described in Comparative Example 1, 20 g of diiodomethane being added instead of 1,4-diiodoperfluorobutane. In order to maintain the initial pressure, only 24 g of VDF and 18 g of HFP were forced in under pressure within 6 hours. The reaction mixture contained less than 0.5 wt.% of solids, which could not be isolated.

Rubber Compound Mix and Reactive Adjustment

Example 9

180 kg of the fluoro rubber polymer from Example 1 were placed in a 300 l capacity Z kneader with a discharge screw (e.g. from Linden), the polymer was plasticized at 30° C. to 50° C., and 5.4 kg of carbon black MT 990, 5.4 kg of Ca(OH)$_2$, 7.2 kg of TAIC 50%, and 5.4 kg of Luperco 130-XL 45 (2,5-dimethyl-2,5-(bis-t-butylperoxy)-hexyne-3) were added under nitrogen. After homogenising the composition over 1 hour 20 l capacity drums were filled at 80° C. to 100° C. with the composition through the discharge screw and optionally an additional ram extrusion device, the composition beneath the surface remaining largely bubble-free.

Processing

Example 10

A 20 l capacity drum filled in a similar manner to that described in Example 9 was sealed in a drum melt unit (Nordson BM 506), and connected via a heated line and non-return valve to an injection moulding machine (Arburg Type Allrounder 500-90 270 D). A temperature of ca. 95° C. was adjusted with the drum melt unit and the composition was forced through the heated connection line into the screw of the injection moulding machine. A multipart mould for producing a sealing sleeve weighing ca. 6.2 g and with wall thicknesses of 1–2 mm was connected to the ejection nozzle of the injection moulding machine. The temperature of the mould cavity was adjusted to 200° C. by means of an electrical heating device.

After a start-up phase the vulcanised sealing sleeve was removed from the mould cavity. The mould filling and curing time was 2 minutes.

Example 11

A granulate of particle diameter size 4–10 mm was produced in a melt granulator from 5 kg of the peroxide-containing rubber described in Example 9, which had a melt temperature of <5° C. This granulate was charged into a feed hopper above an ejection moulding machine with a feed opening for powder (Boy SSV dipronioc/powder). The screw, heated to 110° C., forced the rubber composition into the mould described in Example 11.

Two-component Process: Master Batch+ Crosslinking Agent Batch.

Example 12

A rubber melt was mixed with carbon black, Ca(OH)$_2$ and TAIC in the same way as described in Example 9 but without addition of peroxide, and was pressed into 20 l capacity drums,=component A.

At the same time a mixture was prepared as in Example 10 from a polymer having a viscosity of 0.9 kPa.s at 70° C., in which the amount of peroxide was 10 times greater,= component B. 61 kg of TRIGONOX 29-40 (FLEXSYS=1, 1-bis(tert.-butylperoxy)-3,5,5-trimethylcyclohexane were used as peroxide.

The rubber melt B was mixed at ca. 40°–50° C. in a kneader, discharged from the latter into drums, and cooled to 20° C.

The first mentioned peroxide-free component A was fed by means of a drum melt unit (BM 506) at a temperature of 110° C. to a heated static mixer installed in front of the injection moulding machine (Arburg).

At the same time the component B at a temperature of 70° C. was fed from a second drum melt unit (BM 506) to the heated static mixer in front of the injection moulding machine.

The components A and B were fed in a ratio of 9:1.

The cured sealing sleeves could be removed from the mould in each case after ca. 1 minute.

We claim:

1. Fluororubber comprising a polymer of a) vinylidene fluoride and optionally further fluorine-containing and/or non-fluorine-containing monomers, and b) at least one compound from the group consisting of diiodomethane, 1,2-diiodo-1,1-difluoroethane, 1-iodo-2-bromo-1,1-difluoroethane, 1-bromo-2-iodo-1,1-difluoroethane and 1,2-dibromo-1,1-difluoroethane, in which at least 80% of the terminal groups in the polymer have the formula —CH$_2$—X where X=Br and/or I, wherein the fluororubber polymer contains iodine and/or bromine in amounts of 1–5 wt.% by weight of polymer and has a complex viscosity at 100° C. and ω=6.3 s$^{-1}$ of 0.01–30 kPa.s, as well as a temperature index, calculated as quotient of the viscosities at 40° and 100° C., of 3–250.

2. Fluororubber according to claim 1, wherein compound b) is diiodomethane.

3. Fluororubber according to claim 1, further characterised in that it is crosslinked to form rubber-elastic mouldings.

4. Fluororubber according to claim 1, wherein said further fluorine-containing and/or non fluorine containing monomers are at least one compound selected from the group tetrafluoroethylene and chlorotrifluoroethylene, hexafluoropropene, 3.3.3-trifluoropropene, chloropentafluoropropene, hexafluoroisobutene and/or perfluorinated vinyl ethers of the formula $CF_2=CF-O-X$ where $X=C_{1-C3}$-perfluoroalkyl or $(CF_2-CFY-O)_n-R_F$ wherein n=1–4, Y=F or $CF_3$ and $R_{F=C1}-C_3$-perfluoroalkyl or combinations thereof for the fluorine containing monomers and/or at least one compound selected from the group of ethylene, propene, isobuten or vinyl ester or combinations thereof for the non fluorine containing monomers.

5. Process for producing a fluororubber, wherein a) vinylidene fluoride and optionally further fluorine-containing and/or non-fluorine-containing monomers are polymerised by a free radical mechanism at temperatures of 0° C. to 70° C. in the presence of b) at least one compound selected from the group consisting of diiodomethane, 1,2-diiodo-1,1-difluoroethane, 1-iodo-2-bromo-1,1-difluoroethane, 1-bromo-2-iodo-1,1-difluoroethane, 1,2-dibromo-1,1-difluoroethane or mixtures thereof, and in the presence of an initiator, further auxiliaries or both.

6. Process according to claim 5, wherein the free radical polymerisation is carried out in aqueous emulsion in the presence of a redox initiator system.

7. A coating comprising the fltororubber of claim 1.

8. A polymer-analogous reaction in which the iodine or bromine terminal groups of the fluororubber according to claim 1 are replaced by other reactive groups via nucleophilic or radical substitution.

9. Process for producing fluororubber mouldings and/or coatings, characterised in that fluororubbers having a viscosity temperature index at 40°/100° C. of 3 to 250 are injection moulded at temperatures of 40 to 250° C. under pressure in moulds heated to 100° to 250° C. and are crosslinked therein.

10. Process according to claim 9, characterised in that a fluororubber or a mixture of several fluororubbers according to claim 1 is used as fluororubber.

* * * * *